United States Patent [19]

Baker

[11] Patent Number: 5,433,272
[45] Date of Patent: Jul. 18, 1995

[54] METHODS FOR TREATING A PERMEABLE MATRIX

[76] Inventor: Mason Baker, P.O. Drawer 926, Oxford, Miss. 38655

[21] Appl. No.: 158,224

[22] Filed: Nov. 29, 1993

[51] Int. Cl.$^6$ .............................................. E21B 43/27
[52] U.S. Cl. ..................................... 166/300; 166/307; 507/260; 507/933
[58] Field of Search ............... 166/271, 300, 307, 312; 252/8.553; 507/260, 933

[56] References Cited

U.S. PATENT DOCUMENTS

| | | | |
|---|---|---|---|
| 3,528,503 | 9/1970 | Crowe | 166/307 X |
| 3,548,945 | 12/1970 | Gidley | 166/307 |
| 3,550,686 | 12/1970 | Knox | 166/307 |
| 3,625,284 | 12/1971 | Gogarty et al. | 166/307 X |
| 3,909,381 | 9/1975 | Ehrsam . | |
| 4,194,566 | 3/1980 | Maly | 166/307 |
| 4,483,887 | 11/1984 | Garcia . | |
| 4,604,233 | 8/1986 | Rootsaert et al. | 252/8.553 X |
| 4,675,120 | 6/1987 | Martucci | 252/8.553 |
| 4,778,006 | 10/1988 | Derowitsch | 252/8.553 X |
| 4,970,014 | 11/1990 | Garcia . | |
| 4,970,015 | 11/1990 | Garcia . | |
| 5,019,288 | 5/1991 | Garcia . | |
| 5,031,700 | 7/1991 | McDougall et al. | 166/307 |

*Primary Examiner*—George A. Suchfield
*Attorney, Agent, or Firm*—Terry B. Morris

[57] ABSTRACT

Methods are provided for acidizing treatment of a permeable matrix by infusing a pre-acidizing composition and an activating composition. Components of the pre-acidizing composition include hydrochloric acid, phosphoric acid, a hydroxy carboxylic acid and a dicarboxy acid.

10 Claims, No Drawings

METHODS FOR TREATING A PERMEABLE MATRIX

BACKGROUND

Numerous compositions and processes have been employed in the past for the purpose of removing obstructions in the subterranean matrix structure containing oil and gas. Such obstructions can be exemplified by mineral, organic or other deposits in the matrix fractures or channels through which oil or gas flows to a recovering well. Prior methods to remove obstructions included forcing sand or gels into the matrix to break the obstructions or otherwise increase the channels. Other methods involve attacking the obstructions such as by "acidizing" by treatment with acid. Typical of these methods involve the injection of substances through the well to deliver the treating substances. However, such delivery has problems. One problem is that when acidizing, the acid strength is strongest near the well and weakens along the gradient moving away from the well. This is because the acid reacts first with the obstructive material (e.g. calcium carbonate deposits) nearest the well. Accordingly, as the injected treating material moves from the well, it becomes weakened or spent. A result is requisite multiple treatments resulting in over-treatment near the well and under-treatment away from the well. The spent material is typically recovered back through the well between treatments or after a final treatment.

Because such acids are corrosive and dangerous to handle, low concentrations are used. High concentrations, multiple treatments or prolonged treatments can result not only in an undesired heterogeneous result throughout the matrix, but also in attack and damage to the matrix structure, such as on supporting sandstone, with collapse or other problems, and damage to the well, such as casing, connections, etc. There is still needed compositions and methods for enhancing production of oil and gas fields.

BRIEF SUMMARY OF THE INVENTION

The methods of the invention involve treating a permeable matrix by infusing into the matrix a pre-acidizing composition and an activating composition which interacts to produce an effective acidizing composition to remove an obstructive structure. An object of the invention is to provide relatively homogeneous acidizing treatment throughout the matrix. Another object is to provide greater control over the effect of the acidizing composition on the matrix and wells, if present, during such treatment. A further object is to provide a safened composition for use in such methods by humans. Yet another object is to provide economy of time and material in such methods.

DETAILED DESCRIPTION

One embodiment of the present invention is a method for treating a permeable matrix comprising infusing into said matrix a pre-acidizing composition comprising a first amount of concentrated hydrochloric acid, a second amount of concentrated phosphoric acid, a third amount of a suitable hydroxy carboxylic acid, and a fourth amount of a suitable dicarboxylic acid, said pre-acidizing composition optionally further comprising a fifth amount of a suitable carrier for infusion, and infusing into the matrix an activating composition comprising an activating agent, wherein said pre-acidizing composition and said activating composition interact to produce an effective acidizing composition to remove an obstructive structure in said matrix.

The permeable matrix treatable with the present invention is any permeable or porous three dimensional structure which has obstructive matter or deposits in the flow channels of the matrix. Such matters can partially or completely obstruct the flow through the channels. The obstructive matter will be such as is treatable by the acidizing composition formed by the inventive method. A preferred method is using the inventive method to treat a subterranean structure containing gas or liquid.

The inventive method can be used to treat natural or man-made mineral deposits which can be dissolved by the acidizing composition sufficiently to at least partial remove obstruction to flow. A particularly preferred use is to perform the method to treat by acidizing mineral deposits, such as calcium carbonate or other carbonates, which are present in the subterranean matrix of oil or gas fields. Removal of such matter permits enhanced recovery of oil or gas from these fields.

The inventive method comprises the infusion of two compositions. One composition is a pre-acidizing composition. The other composition is an activating composition. The sequence and timing of the infusing of the two compositions can vary according to the requirements of the particular use. That is, infusing one composition can precede the infusing of the other composition, or partial or complete co-infusing can be performed. With multiple points of infusing into the matrix, counter-infusing (e.g. counter-current infusing) can be performed. In a preferred method, the infusing of the pre-acidizing composition is prior to the infusing of the activating composition.

The hydrochloric acid component of the invention can conveniently be concentrated hydrochloric acid commercially obtained, preferably concentrated hydrochloric acid which is at least about twenty weight percent by hydrochloric acid, preferably about thirty to about forty percent by weight. Higher concentrations can be used. Such weight percentages are based upon the total component weight. The hydrochloric acid can be in admixture with significantly deionized, preferably essentially deionized, water.

The phosphoric acid component is concentrated phosphoric acid, preferably ortho-phosphoric acid, at a preferred concentration of about eighty to ninety weight percent of an admixture with significantly deionized, preferably essentially deionized, water, more preferably a concentration of about eighty-five weight percent. Such weight percentages are based upon the total component weight.

The hydroxy carboxylic acid is selected from a group consisting of citric acid, tartaric acid and malic acid. Preferred is citric acid. The citric acid is preferably anhydrous citric acid.

The dicarboxylic acid is selected from a group consisting of oxalic acid, malonic acid, succinic acid, glutanic acid and adipic acid; preferably oxalic acid. The oxalic acid is preferably the dihydrate form of oxalic acid.

The suitable carrier which represents the fifth amount of components hereinabove can be water, preferably significantly deionized water, more preferably essentially deionized water.

The components (i.e., which preferably are a first amount of hydrochloric acid, second amount of phosphoric acid, third amount of citric acid, fourth amount of oxalic acid and fifth amount of water) of the invention are in relative proportions to effectively treat deposits in the matrix. Such effective treatment can cause dissolution or removal of a substantial amount, preferably essentially all, of the deposit in the matrix. The treating of the deposits should result in little loss of beneficial structure material of the matrix, such as supporting sandstone. The proportions of the amounts and the effectiveness of treating will vary according to the conditions of the matrix, but those of ordinary skill in the art can determine the effective or optimal proportions for the particular use with reasonable effort. While the present invention has use in the field operations of the oil and gas industry, its use is not limited to such environs. Without limitation to the following disclosed environs of use, the present invention can be used also in water well regimens or other permeable matrix.

As a starting guide, but not as a limiting requirement, one preferred pre-acidizing composition is the following:

| Component | | Weight Percent of Composition Amount |
|---|---|---|
| (1) | concentrated hydrochloric acid (36.5 to 38 weight percent of component amount) | 8.6 |
| (2) | concentrated ortho-phosphoric acid (85 weight percent of component amount) | 5.0 |
| (3) | anhydrous citric acid | 2.6 |
| (4) | dehydrated oxalic acid | 2.32 |
| (5) | deionized water | 81.48 |

The relative amounts are selected to maintain a "safened" characteristic, that is, not only safe to handle as being innocuous to human skin, but also without free hydrogen ions which act to dissolve the mineral deposit prematurely before the pre-acidizing solution has been dispersed through the fractures or matrixes.

A preferred method is one wherein the suitable hydroxy carboxylic acid is selected from a group consisting of citric acid, tartaric acid, and malic acid, and the dicarboxylic acid is selected from a group consisting of oxalic acid, malonic acid, succinic acid, glutaric acid and adipic acid.

A preferred suitable carrier for the pre-acidizing composition is deionized water.

Preferably, the activating agent is water containing activants. Such activants can be the ions typical in field or well water. A convenient source is the process water available in oil and gas fields.

A preferred embodiment is where the pre-acidizing composition comprises a first amount of concentrated hydrochloric acid of at least about forty weight percent of the pre-acidizing composition, said concentrated hydrochloric acid being at least thirty weight percent in concentration; a second amount of concentrated phosphoric acid of at least about five weight percent of the pre-acidizing composition, said concentrated phosphoric acid being at least eighty percent in concentration; a third amount of anhydrous citric acid of about two to about five weight percent of the pre-acidizing composition; a fourth amount of oxalic acid of about two to about five weight percent of the pre-acidizing composition; and substantially the balance being deionized water.

In another embodiment, multiple infusing of the activating composition can occur. For instance, after the pre-acidizing composition and initial activating composition interest to produce an acidizing composition, the initially formed acidizing composition acts to remove obstructive structure in the matrix. After a time, acidizing activity can weaken or stop. A subsequent infusing of activating composition, with or without additional pre-acidizing composition, can be performed which enacts with pre-acidizing composition in the matrix to form new acidizing composition.

By controlling the relative infusing of pre-acidizing composition and activating composition, the present methods permit a relatively homogeneous treatment of a matrix by reducing or minimizing the acid strength gradient effects heretofore experienced. This benefit is attainable by strategically infusing into place the components of the pre-acidizing composition before becoming into interaction with the activating composition to create the acidizing character. The strength gradient is thereby controllable and/or reducible.

Another embodiment of the present invention further comprises removing the obstructive structure with the above composition, thereby creating a spent composition, recovering said spent composition, and separating from said spent composition a recyclable pre-acidizing composition.

For example, after treating an oil or gas field, the spent composition can be recovered through the well (e.g. the oil or gas well serving as the injection well for infusing compositions) and piped into a suitable separation operation, such as a settling tank. The pre-acidizing composition can be sufficiently separated and recycled for re-infusing. This recovery has benefits in avoiding the corrosive fumes and human exposure to toxic streams which can be present in higher energy recovery systems, such as distillation units which are sometimes used to recover the prior acid composition.

The foregoing detailed description of the invention has been given for clearness of understanding only, and are not intended or unnecessary limitations. Obvious changes will be readily suggested to those skilled in the art. The following claims are not intended to be limiting on the scope of the invention herein.

What is claimed is:

1. A method for treating a permeable matrix comprising infusing into said matrix a pre-acidizing composition comprising a first amount of concentrated hydrochloric acid, a second amount of concentrated phosphoric acid, a third amount of a suitable hydroxy carboxylic acid, and a fourth amount of a suitable dicarboxylic acid, said pre-acidizing composition optionally further comprising a suitable carrier for infusion, and infusing into said matrix an activating composition comprising an activating agent, wherein said pre-acidizing composition and said activating composition interact to produce an effective acidizing composition to remove an obstructive structure in said matrix.

2. The method of claim 1 wherein the permeable matrix is a subterranean structure containing gas or liquid.

3. The method of claim 1 wherein the infusing of the pre-acidizing composition is prior to the infusing of the activating composition.

4. The method of claim 1 wherein the suitable hydroxy carboxylic acid is selected from a group consisting of citric acid, tartaric acid, and malic acid, and the dicarboxylic acid is selected from a group consisting of oxalic acid, malonic acid, succinic acid, glutaric acid and adipic acid.

5. The method of claim 1 wherein the suitable carrier is deionized water.

6. The method of claim 1 wherein the activating agent is water containing activants.

7. The method of claim 1 wherein the obstructive structure is a carbonate deposit.

8. The method of claim 1 where the pre-acidizing composition comprises:

(1) a first amount of concentrated hydrochloric acid of at least about forty weight percent of the pre-acidizing composition, said concentrated hydrochloric acid being at least thirty weight percent in concentration;

(2) a second amount of concentrated phosphoric acid of at least about five weight percent of the pre-acidizing composition, said concentrated phosphoric acid being at least eighty percent in concentration;

(3) a third amount of anhydrous citric acid of about two to about five weight percent of the pre-acidizing composition;

(4) a fourth amount of oxalic acid of about two to about five weight percent of the pre-acidizing composition; and (5) substantially the balance being deionized water.

9. The method of claim 1 further comprising a second infusing of an activating composition.

10. The method of claim 1 further comprising removing the obstructive structure, thereby creating a spent composition, recovering said spent composition, and separating from said spent composition a recyclable pre-acidizing composition.

* * * * *